J. F. COURSON.
FRICTION DRAFT GEAR.
APPLICATION FILED FEB. 8, 1909.
945,700.
Patented Jan. 4, 1910.
2 SHEETS—SHEET 2.
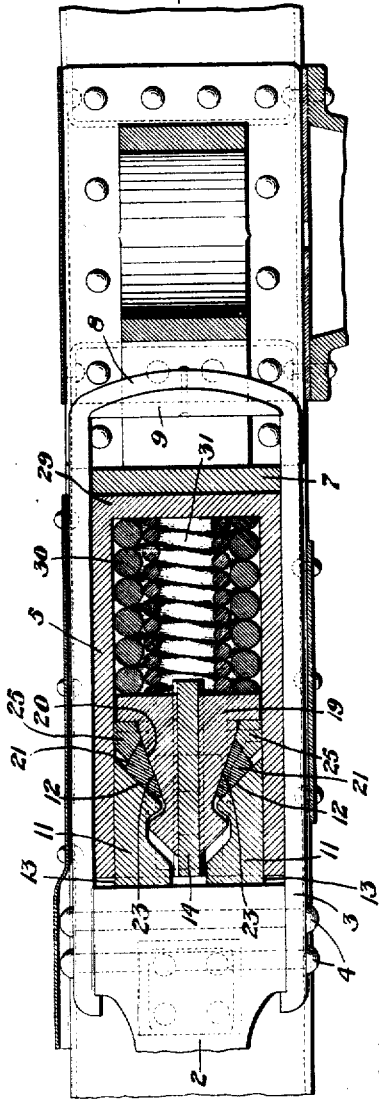
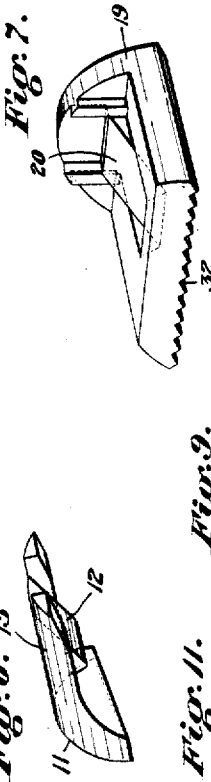
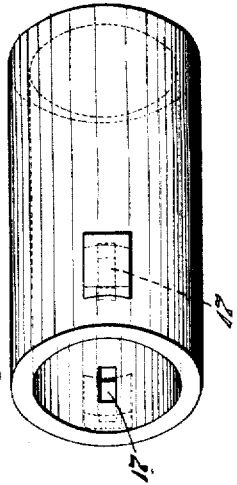
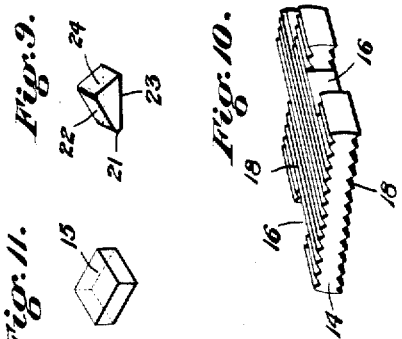
Witnesses:
Chas. S. Lipley
Henry Sens
Inventor:
John F. Courson
by C. M. Clarke
his Attorney

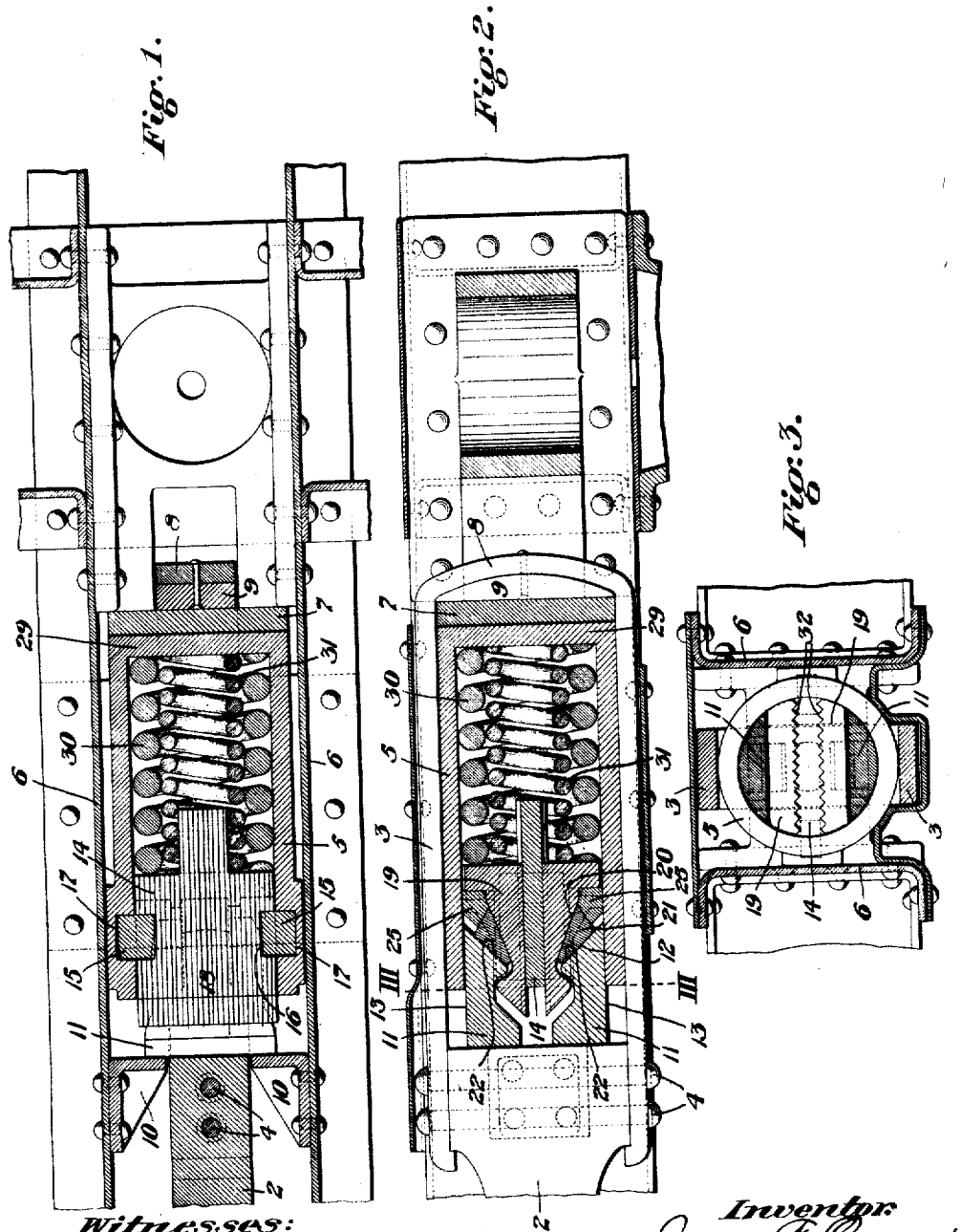

UNITED STATES PATENT OFFICE.

JOHN F. COURSON, OF PITCAIRN, PENNSYLVANIA.

FRICTION DRAFT-GEAR.

945,700.  Specification of Letters Patent.  Patented Jan. 4, 1910.

Application filed February 8, 1909. Serial No. 476,589.

*To all whom it may concern:*

Be it known that I, JOHN F. COURSON, a citizen of the United States, residing at Pitcairn, in the county of Allegheny and State of Pennsylvania, have invented certain new and useful Improvements in Friction Draft-Gear, of which the following is a specification, reference being had therein to the accompanying drawing.
My invention relates to the class of friction draft gearing or rigging for railway cars, etc., and it has for its object to provide a draft gearing of simple construction and high efficiency, and is designed to utilize the wedging and releasing qualities of wedge blocks between the central buffing member and surrounding friction member or members, having faces disposed at varying angles, together with centrally arranged fixedly secured longitudinal friction element, and to other features of construction as shall be more fully hereinafter set forth in the specification and embodied in the claims.

In the accompanying drawings illustrating the invention:—Figure 1 is a central horizontal sectional view of the complete draft rigging assembled, the parts being in their extended position. Fig. 2 is a vertical sectional view at right angles to Fig. 1 the parts being in the same position. Fig. 3 is a transverse sectional view on the line III. III. of Fig. 2. Fig. 4 is a view similar to Fig. 2 showing the parts in compressed position. Fig. 5 is a perspective detail view of the inclosing cylindrical shell or casing for the working parts. Fig. 6 is a similar view of one of the buffing blocks which normally engage the draw bar. Fig. 7 is a similar view of one of the movable friction blocks for engaging with the central fixed friction block. Fig. 8 is a similar view of one of the friction blocks for engagement with the outer shell. Fig. 9 is a similar view of one of the differential angle wedge blocks inserted between the buffing block and the main movable friction block. Fig. 10 is a similar view of the central stationary friction tongue. Fig. 11 is a similar view of one of the interlocking blocks for holding said tongue in engagement with the shell.

In the drawings, 2 represents the draw bar of the coupler fixedly connected with the yoke 3 by the transverse bolts 4 in the manner customary in this art, said yoke embracing the casing 5 mounted between the center sills 6, 6, and preferably bearing upon casing 5 at top and bottom as shown.

7 is a filling block or piece set against the rear end of casing 5, against the outer end of which block bears the rounded end 8 of the strap 3 with an interposed filling block 9, preferably secured to the end of the strap as shown.

10 are the front stops which sustain the pulling effect of the draft gear and impart it to the center sills 6, to which the said stops, of angle form, are secured by riveting or otherwise.

11, 11, are the buffing blocks of the construction shown in Fig. 6, bearing by their front ends against the stops 10 and also normally against the rear end of draw bar 2, said buffing blocks having at their inner rear portions angularly shouldered wedge faces 12, 12, their outer faces 13 being rounded cylindrically to engage the inner cylindrical face of casing 5.

14 is a centrally arranged relatively stationary friction tongue extending transversely between the inner walls of cylinder 5 and fixedly connected therewith by means of interlocking keys 15 inserted in openings 16, 16, in the sides of said tongue, and in receiving sockets 17, 17, in the inner front portion of the casing, as clearly shown in Fig. 1. The rear body portion of said tongue is narrowed and extends backwardly as shown, the opposite faces of the tongue being grooved as indicated at 18, 18, on opposite sides, thereby providing frictional surfaces for the main movable similarly grooved faces 32 of friction blocks 19, Fig. 7. Said frictional blocks are generally semi-cylindrical in outline at their rear portions to fit loosely within the casing 5, and their outer body portions are provided with angle-faced wedge bearing surfaces 20 at a somewhat more acute angle to the longitudinal center than faces 12 of the buffing blocks 11. Between said faces 20 on the main movable friction blocks and face 12 of the buffing blocks, are interposed the differential angle wedge blocks 21 having upon their outer portions the wedge faces 22, upon their inner portions the wedge faces 23 of a more acute angle to the longitudinal center relatively than faces 22, and at their outer end portions wedge faces 24. Between said faces 24 and the inner curved faces of the casing 5 are interposed additional friction blocks 25 having curved faces 26 corresponding to the curve of the inner faces of casing 5, inner forward wedge faces 27, and inner rear wedge faces 28, adapted to make contact with faces 24 of wedge block 21 and incidentally with faces 20 of friction block 19 respectively, in the operation of the device.

The forward portion of the main movable friction block 19 interfits with the inner forward shoulder of wedge 12, as indicated in Figs. 2 and 4, whereby longitudinal separation of these parts is prevented. As thus assembled it will be seen that relative movement of the main friction blocks 19 and buffing blocks 11 toward each other will cause an outward wedging action to bind the buffing blocks and also the friction blocks 25 against the inner faces of casing 5; and that movement in an opposite direction tending to separate the main movable friction blocks 19 longitudinally from buffing blocks 11, will relieve such frictional engagement and wedging action.

Interposed between the inner rear end 29 of cylinder 5 and the outer faces of the semicylindrical flange elements of the main movable friction blocks 19, are the buffing springs 30 and 31, nested compactly together and adapted to interpose increasing resistance either to the impact of buffing in the operation of coupling or in the initial operation of starting the car.

The object of the present construction is, as is generally the case in all similar apparatus, to interpose a high degree of frictional resistance between the moving parts and the relatively stationary parts of the apparatus, i. e., between casing 5 and the outer faces 13 of buffing blocks 11 and friction blocks 25, and between the inner longitudinally grooved faces 32 of the main movable friction blocks 19 and the similarly grooved friction faces 18 of the relatively stationary friction tongue 14. This object is secured by the wedging action of the interposed blocks 21 and 25, due to the expanding effect of their tapering faces co-acting with the corresponding tapering faces of the buffing blocks and friction blocks.

A further object is to prevent jamming and provide for immediate and easy operation of these parts upon expansion of the springs. When pressure is relieved, either from pulling or buffing action, the springs will act through friction blocks 19 to force the parts outwardly, and release them from engagement. This action is greatly facilitated by the differential angle wedge blocks in the manner described. Thus upon release of pressure, the relation of the angles is such that the more obtuse angles 22 of wedge blocks 21 facilitate separation and a resulting backward travel of buffing blocks 11, thereby immediately releasing the frictional contact and overcoming any tendency to bind, so that the wear of the parts is reduced to a minimum and their easy, successful operation facilitated.

While the use of acute angle wedges is of great advantage and the separating effect is increased in proportion to the force of impact, limitations have heretofore existed by reason of the fact that quick separation has been prevented due to the binding action of such acute wedges. This disadvantage is completely overcome in my present construction.

The operation of the apparatus will be readily understood from the foregoing description. In buffing, the buffing blocks 16 move to a sufficient extent into the casing 5 giving the desired wedging separation for operation of the friction elements, and in pulling the parts are similarly rotated by the strap 3 operating through blocks 9 and 7 against the end of the casing. Upon release of pressure from either direction, the resiliency of the springs will replace the parts in their normal or relative positions.

Having described my invention, what I claim is:—

1. In a friction draft gear, the combination with the casing, of a fixed friction element, friction blocks engaging said element, buffing blocks, and interposed differential angle wedge blocks, substantially as set forth.

2. In a friction draft gear, the combination with the casing, of a fixed friction element having longitudinally grooved faces, friction blocks having similar faces engaging said element, buffing blocks, and interposed differential angle wedge blocks, substantially as set forth.

3. In a friction draft gear, the combination with the casing, of a centrally arranged friction tongue, friction blocks engaging said tongue at each side, buffing blocks engaging the casing, and differential angle wedge blocks interposed between the friction blocks and the buffing blocks, substantially as set forth.

4. In a friction draft gear, the combination with the casing, of a fixed friction element, friction blocks engaging said element, buffing blocks, interposed differential angle wedge blocks, and supplemental friction blocks engaging said wedge blocks, substantially as set forth.

5. In a friction draft gear, the combination with the casing, of a fixed friction element, friction blocks engaging said element having faces inclined to the longitudinal center of the casing, buffing blocks having opposing faces more abruptly inclined than said faces, and interposed differential angle wedge blocks, substantially as set forth.

6. In a friction draft gear, the combination with the casing, of a longitudinally grooved friction tongue fixedly secured transversely of the casing, friction blocks having grooved faces engaging said tongue at each side and provided with inclined wedge-bearing faces, buffing blocks having faces engaging the interior of the casing and inclined wedge-bearing faces, and differential angle wedge blocks interposed between the friction blocks and the buffing blocks, substantially as set forth.

7. In a friction draft gear, the combination with the casing, of a longitudinally grooved friction tongue fixedly secured transversely of the casing, friction blocks having grooved faces engaging said tongue at each side and provided with inclined wedge-bearing faces, buffing blocks having faces engaging the interior of the casing and inclined wedge-bearing faces, differential angle wedge blocks interposed between the friction blocks and the buffing blocks, and supplemental friction blocks engaging said wedge blocks and the casing, substantially as set forth.

8. In a friction draft gear, the combination with the casing, of a fixed friction tongue, friction blocks, buffing blocks, interposed differential angle wedge blocks, spring mechanism, and draw bar and yoke mechanism arranged to transmit movement to said parts, substantially as set forth.

9. In a friction draft gear, the combination with the casing, yoke and draw bar; of a fixed friction tongue, friction blocks, buffing blocks, and interposed differential angle wedge blocks, substantially as set forth.

10. In a friction draft gear, the combination with the casing, yoke and draw bar; of a friction tongue, friction blocks, buffing blocks, interposed differential wedge blocks, spring mechanism, and supplemental friction blocks, substantially as set forth.

In testimony whereof I affix my signature in presence of two witnesses.

JOHN F. COURSON.

Witnesses:
C. M. CLARKE,
CHAS. S. LEPLEY.